(12) United States Patent
Cai et al.

(10) Patent No.: US 12,470,061 B2
(45) Date of Patent: Nov. 11, 2025

(54) VEHICLE EMERGENCY START DEVICE AND WIRE CLIP DEVICE

(71) Applicant: SHENZHEN KALAIFU TECHNOLOGY CO., LTD., Shenzhen (CN)

(72) Inventors: Lian Cai, Guangdong (CN); Tao Cai, Guangdong (CN)

(73) Assignee: SHENZHEN KALAIFU TECHNOLOGY CO., LTD., Shenzhen (CN)

(*) Notice: Subject to any disclaimer, the term of this patent is extended or adjusted under 35 U.S.C. 154(b) by 824 days.

(21) Appl. No.: 17/710,477

(22) Filed: Mar. 31, 2022

(65) Prior Publication Data

US 2023/0187932 A1    Jun. 15, 2023

(51) Int. Cl.
 *H02J 1/10* (2006.01)
 *H02J 7/00* (2006.01)
 *H03K 17/78* (2006.01)

(52) U.S. Cl.
 CPC ............ *H02J 1/122* (2020.01); *H02J 7/0034* (2013.01); *H03K 17/78* (2013.01)

(58) Field of Classification Search
 CPC ........ H02J 1/122; H02J 7/0034; H02J 7/0063; H02J 7/0029; H02J 7/00304; H02J 7/00308; H02J 7/0036; H02J 7/0045; H02J 9/06; H03K 17/78; Y02T 10/70; B60L 3/0092; B60L 50/60

USPC .......................................................... 320/105
See application file for complete search history.

(56) References Cited

U.S. PATENT DOCUMENTS

| | | | | |
|---|---|---|---|---|
| 8,860,377 | B2* | 10/2014 | Scheucher | H02J 7/0045 |
| | | | | 320/162 |
| 10,093,186 | B2* | 10/2018 | Liu | B60L 3/0046 |
| 10,174,736 | B2* | 1/2019 | Zhang | H02J 7/345 |
| 10,926,768 | B1* | 2/2021 | Brown | B60R 16/0231 |
| 11,591,996 | B2* | 2/2023 | Koebler | F02N 11/0807 |
| 11,901,729 | B2* | 2/2024 | Lei | H02J 7/342 |
| 2008/0127926 | A1* | 6/2008 | Kim | B60R 25/406 |
| | | | | 123/179.2 |
| 2008/0192396 | A1* | 8/2008 | Zhou | H02H 3/207 |
| | | | | 361/86 |
| 2021/0138924 | A1* | 5/2021 | Neitz | B60L 53/11 |
| 2022/0272084 | A1* | 8/2022 | Hyatt | H04W 4/70 |

* cited by examiner

*Primary Examiner* — M Baye Diao
(74) *Attorney, Agent, or Firm* — Westbridge IP LLC

(57) ABSTRACT

A vehicle emergency start device and a wire clip device are provided. The vehicle emergency start device includes a switch module, a reverse connection protection module, an emergency start switch and an output module; the switch module is respectively connected to the emergency start power supply of the vehicle and the output module, and the reverse connection protection module is used for reverse connection detection and/or load detection; and the emergency start switch is connected to the switch module.

13 Claims, 6 Drawing Sheets

VEHICLE EMERGENCY START DEVICE AND WIRE CLIP DEVICE

CROSS-REFERENCES TO RELATED APPLICATIONS

The present application claims the priority benefit of Chinese patent application serial no. CN202111529538.8, filed with the Chinese Patent Office on Dec. 14, 2021, entitled "Vehicle Emergency Start Device and Wire Clip Device," the entire contents of which are incorporated into the present disclosure by reference.

TECHNICAL FIELD

The present application relates to the technical field of emergency power devices, in particular to a vehicle emergency start device and a wire clip device.

BACKGROUND ART

Currently, auto emergency start power is a multi-functional portable mobile power supply developed for people who love cars and business people who travel by driving. The featured function thereof enables starting an auto when the auto cannot be started due to power loss or other reasons. It combines an inflator pump with functions such as emergency power supply and outdoor lighting, and one of must-have products for outdoor travels.

In the prior art, access of auto emergency start power to the vehicle is typically implemented through a jump control system. The existing jump control system detects fault information (such as undervoltage, reverse connection, short circuit, etc.) through various detecting modules (such as undervoltage detecting module), and then transmits the fault information to MCU (Microcontroller Unit) for signal processing and circuit control. As the existing jump-start control systems have to use a variety of complex detecting modules and MCU to achieve fault detection and circuit control, it appears problems such as high hardware costs and poor protection performance.

SUMMARY

The objectives of embodiments of this application are to provide a vehicle emergency start device, a wire clip device, and a jump control system, which can achieve the technical effects of reducing hardware costs and improving protection performance.

In the first aspect, embodiments of this application provide a vehicle emergency start device, including a switch module, a reverse connection protection module, an emergency start switch and an output module;
  the switch module is connected to the emergency start power supply and output module of the vehicle respectively;
  the reverse connection protection module is connected to the switch module and the output module respectively, and is used for performing reverse connection detection and/or load detection; and
  the emergency start switch is connected to the switch module.

In the above implementation process, the vehicle emergency start device is connected to the vehicle storage battery through the output module, then the switch module is connected to the emergency start power supply, and reverse connection protection can be achieved through the reverse connection protection module; when the vehicle storage battery is in normal use, the switch module and the output module clips are in ON state, at which time the vehicle can be started; when the vehicle storage battery cannot be normally used, emergency start can be achieved through the emergency start switch; the vehicle emergency start device owns a reasonable circuit structure and can achieve fault detection and circuit control of the hardware circuitry without the signal processing in the MCU, so that the technical effect of reducing hardware costs and improving protection performance can be realized.

Further, the switch module includes a relay, and the protection circuit further includes a first transistor and a current sensing resistor; and
  the first terminal of the relay is respectively connected to the positive electrode of the emergency start power supply and the positive electrode of the output module, the second terminal of the relay is connected to the second terminal of the first transistor, the third terminal of the first transistor is grounded, the third terminal of the relay is connected to the negative electrode of the emergency start power supply through the current sensing resistor, and the fourth terminal of the relay is connected to the negative electrode of the output module.

In the above implementation process, normal starting of the vehicle is achieved by using the relay as an electronic switch.

Further, the reverse connection protection module includes a photocoupler, the first terminal of which is respectively connected to the positive electrode of the emergency start power supply and the positive electrode of the output module, the second terminal of the photocoupler is connected to the negative electrode of the output module, the third terminal of the photocoupler is connected to the switch module, the fourth terminal of the photocoupler is grounded.

In the above implementation process, by installing the photocoupler, when the positive and negative electrodes of the output module are reversely connected to the positive and negative electrodes of the vehicle storage battery, the third terminal of the photocoupler is at a low level, the first transistor cuts off, the relay is in a disconnected state and the clips of the output module cannot output, thus achieving the function of reverse connection protection.

Further, the vehicle emergency start device includes an over current protection module, which is respectively connected to the switch module and the output module.

Further, the over current protection module includes a first stage over current protection module; and
  The first stage over current protection module includes a first operational amplifier, wherein the non-inverting input terminal of the first operational amplifier is connected to a reference voltage and the inverting input terminal of the first operational amplifier is connected to a current sensing resistor, the output terminal of the first operational amplifier is connected to the first terminal of the first transistor, the power supply terminal of the first operational amplifier is respectively connected to the positive electrode of the emergency start power supply and the positive electrode of the output module.

In the above implementation process, the first stage over current protection module sets a first over current protection current value to achieve a first stage over current protection;
  further, the over current protection module further includes a second stage over current protection module; and the second stage over current protection module includes a second operational amplifier, wherein the non-inverting input terminal of the second operational amplifier is connected to the reference voltage and the inverting input terminal of the second operational amplifier is connected to the current sensing resistor, and the output terminal of the second operational amplifier is connected to the first terminal of the first transistor.

In the above implementation process, the second stage over current protection module sets a second over current protection current value to achieve a second stage over current protection.

Further, the vehicle emergency start device includes a reverse charge protection module, which is respectively connected to the switch module and the output module.

Further, the reverse charge protection module includes a third operational amplifier and a fourth operational amplifier;
the non-inverting input terminal of the third operational amplifier is connected to the reference voltage, and the output terminal of the third operational amplifier is connected to the fourth terminal of the photocoupler; and
the non-inverting input terminal of the fourth operational amplifier is grounded, the inverting input terminal of the fourth operational amplifier is connected to the current sensing resistor, and the output terminal of the fourth operational amplifier is connected to the inverting input terminal of the third operational amplifier.

In the above implementation process, after the vehicle is started, the vehicle generator will reversely charge the emergency start power supply of the vehicle, at which time a negative voltage will appear on the current sensing resistor, the voltage signal of the current sensing resistor is compared through the third operational amplifier and the fourth operational amplifier, then turns the photocoupler off, the first transistor cuts off, the relay is disconnected, and the output module clip output is cut off, thus achieving the function of reverse charge protection.

Further, the output module is connected to the vehicle battery, which is respectively connected to the switch module and the battery voltage monitoring module.

Further, the battery voltage monitoring module includes a second transistor and a third transistor;
the second terminal of the second transistor is connected to the power supply terminal of the third operational amplifier, the third terminal of the second transistor is respectively connected to the positive electrode of the emergency start power supply and the positive electrode of the output module;
The first terminal of the third transistor is respectively connected to the positive electrode of the emergency start power supply and the positive electrode of the output module, the second terminal of the third transistor is connected to the first terminal of the second transistor and the third terminal of the third transistor is grounded.

In the above implementation process, when the vehicle storage battery voltage is not enough and it appears undervoltage at the input voltage, the third transistor and the second transistor cut off and then the power supplying of the third operational amplifier is stopped, so that the photocoupler is switched off, the first transistor cuts off, the relay is disconnected and the output module clips have no output, thus achieving the function of undervoltage protection.

Further, the reverse connection protection module includes a fourth transistor, wherein the first terminal of the fourth transistor is respectively connected to the third terminal of the relay, the emergency start switch and the positive electrode of the output module, the second terminal of the fourth transistor is connected to the second terminal of the relay, and the third terminal of the fourth transistor is grounded.

In the above implementation process, when the user reversely connects the clip+ (clip+electrode) and clip−(clip−electrode) in the output module to the positive electrode and the negative electrode of the vehicle storage battery, the fourth transistor cuts off and the reverse connection protection module is in a cut-off state, the relay is in a disconnected state and the output module clips cannot output, thus achieving the function of reverse connection protection.

Further, the protection circuit also includes a first light emitting diode (LED) and a second LED;
The positive terminal of the first LED is grounded and the negative terminal of the first LED is connected to the positive terminal of the output module;
the positive electrode of the first LED is grounded, and the negative electrode of the first LED is connected with the positive electrode of the output module; and
the positive electrode of the second LED is respectively connected to the positive electrode of the emergency start power supply and the first terminal of the relay, the negative electrode of the second LED is connected to the second terminal of the fourth transistor.

In the above implementation process, when the user reversely connects the clip+ and clip− in the output module to the positive electrode and negative electrode of the vehicle storage battery, the first LED emits light, thus reminding the user to achieve the function of reverse connection protection; and when the user connects the clip+ and clip− in the output module to the positive electrode and negative electrode of the vehicle storage battery correctly, the second LED emits light for indication.

Further, the vehicle emergency start device also includes an over voltage protection module, which is respectively connected to the switch module and the output module.

Further, the over voltage protection module includes a fourth transistor and a diode; and
the first terminal of the fourth transistor is connected to the positive electrode of the output module through the diode, the second terminal of the fourth transistor is connected to the reverse connection protection module, and the third terminal of the fourth transistor is connected to the positive electrode of the output module.

Further, the reverse protection module generates signals according to detected reverse connection and/or loads, so as to make the switch module connect the input module to an auto or an auto battery.

In the second aspect, embodiments of this application provide a jump control system for vehicle emergency start, including the vehicle emergency start device described by any of the first aspect.

In the third aspect, embodiments of this application provide a wire clip device for vehicle emergency start, including a switch module, a reverse connection protection module, an emergency start switch, an input module and an output module;
the switch module is respectively connected to the input module and the output module;
The reverse connection protection module is respectively connected to the switch module and the output module, and the reverse connection protection module is used for performing reverse connection detection and/or load detection; and the emergency start switch is connected to the switch module.

Further, the reverse connection protection module generates signals according to detected reverse connection and/or loads, so as to make the switch module connect the input module to an auto or auto battery.

Additional features and advantages of this application will be described in the subsequent section of the specification, or some features and advantages can be deduced or determined without doubt from the specification or can be learned by implementing the above technology disclosed in this application.

In order to make the above objectives, features and advantages of this application more obvious and easier to understand, hereinafter preferred examples are given with the accompanying drawings for detailed description as follows.

BRIEF DESCRIPTION OF DRAWINGS

In order to illustrate the technical solution of this application's embodiments, the drawings which are necessary to be used in embodiments shall be briefly introduced below. It should be appreciated that the following drawings only show some certain embodiments of this application and thus should not be regarded as limiting in scope, and that for a skilled person in the art, other related drawings may be obtained from these drawings without inventive effort.

DETAILED DESCRIPTION OF EMBODIMENTS

Figure 1:
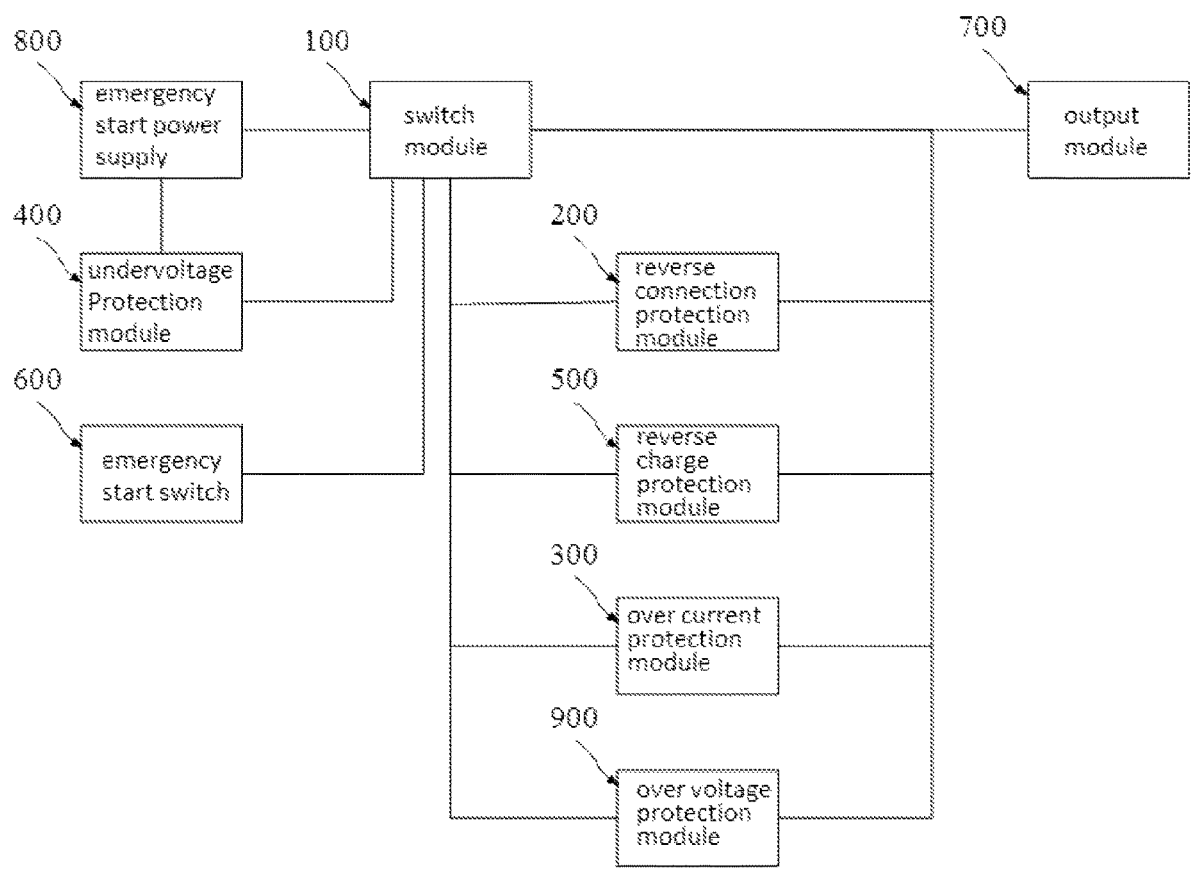
FIG. 1 is a structure block diagram of the vehicle emergency start device provided according to an embodiment of this application.

Technical solutions in the embodiment of this application will be described below in combination with the drawings in the embodiment of this application.

It should be noted that similar reference signs and letters indicate similar items below in the drawings, so that once an item is defined in a drawing, it does not need to be further defined and explained in subsequent drawings. Meanwhile in the description of this application, terms like "first", "second", etc. are merely used for distinguishing the description and cannot be construed as an indication or implication of importance in relativity.

The embodiments of this application provide a vehicle emergency start device, a wire clip device, and a jump control system, which can be used for emergency start process of a vehicle; the vehicle emergency start device is connected to a vehicle storage battery through an output module, and a switch module is then connected to an emergency start power supply; when the vehicle storage battery is in normal use, the switch module and the output module clips are in ON state, at which time the vehicle can be started; when the vehicle storage battery cannot be used normally (such as no storage battery, removal of storage battery wires or the storage battery being completely broken with a voltage of 0V, reverse connection of positive electrode and negative electrode, etc.), reverse connection protection, over current protection, undervoltage protection, reverse charge protection are achieved through the reverse connection protection module, the over current protection module, the battery voltage monitoring module and reverse charge protection module, and the emergency start can be achieved through the emergency start switch; the vehicle emergency start device owns a reasonable circuit structure and can achieve fault detection and circuit control of the hardware circuitry without the signal processing in the MCU, so that the technical effects of reducing hardware costs and improving protection performance can be realized.

Figure 2:
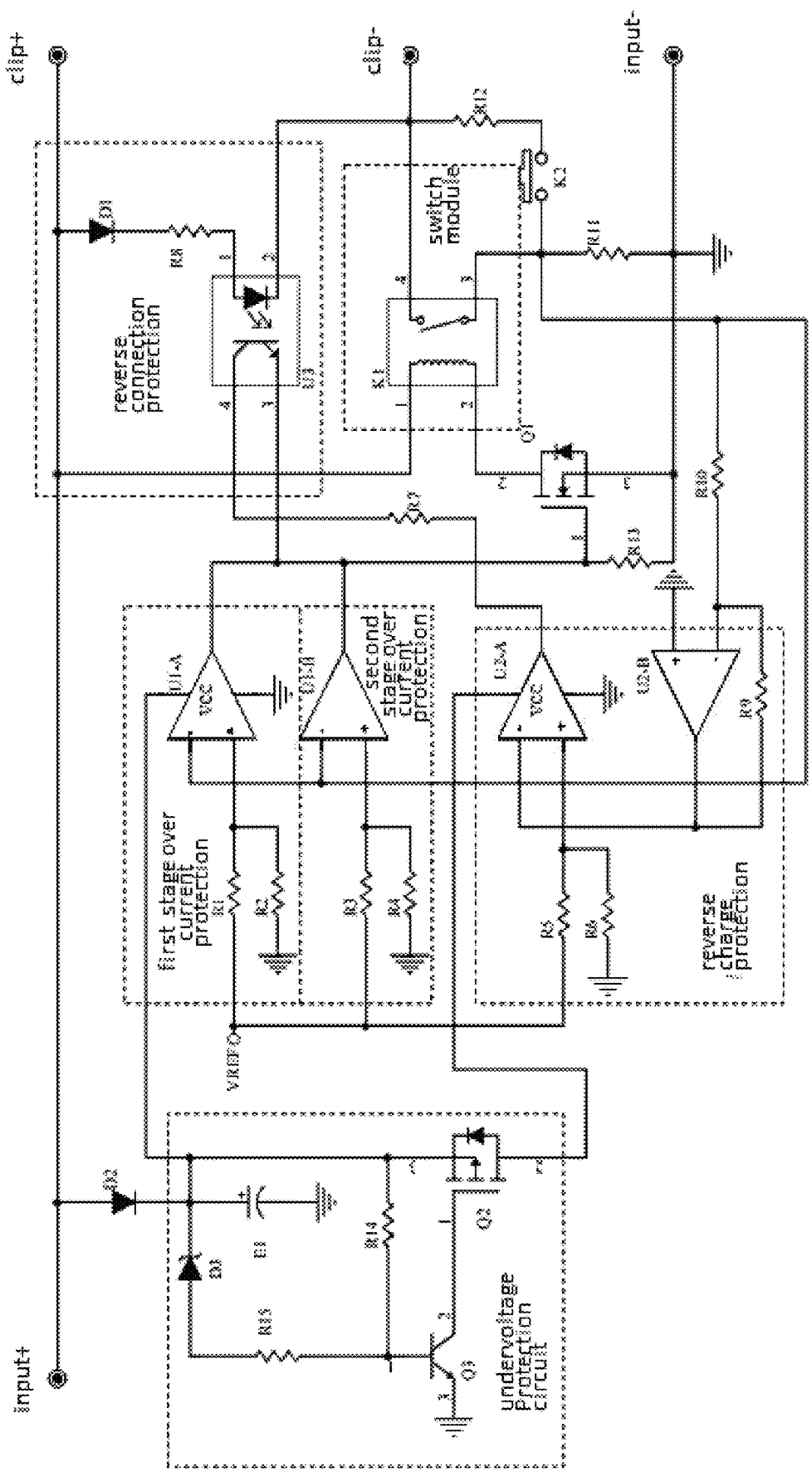
FIG. 2 is a schematic circuit diagram of a first vehicle emergency start device provided according to an embodiment of this application.

Please refer to FIG. 1 and FIG. 2, in which FIG. 1 is a structure block diagram of the vehicle emergency start device provided by the embodiment of this application, and FIG. 2 is a schematic circuit diagram of a first vehicle emergency start device provided by the embodiment of this application; the protection circuit includes: a switch module 100, a reverse connection protection module 200, an over current protection module 300, a battery voltage monitoring module 400, a reverse charge protection module 500, an emergency start switch 600, an output module 700, and an emergency start power supply 800.

Exemplarily, the switch module 100 is respectively connected to the emergency start power supply 800 and output module 700 of the vehicle.

Exemplarily, the reverse connection protection module 200 is respectively connected to the switch module 100 and the output module 700, and the reverse connection protection module 200 is used for reverse connection detection and/or load detection.

Exemplarily, the over current protection module 300 is connected to the switch module 100.

Exemplarily, the battery voltage monitoring module 400 is respectively connected to the switch module 100 and the reverse connection protection module 200.

Exemplarily, the reverse charge protection module 500 is respectively connected to the switch module 100 and the reverse connection protection module 200.

Exemplarily, the emergency start switch 600 is connected to the switch module 100.

Exemplarily, the output module 700 is connected to loads of the vehicle, wherein the loads include a pair of clips, a positive terminal clip and a negative terminal clip, connected to vehicle storage battery, and the output module 700 is respectively connected to the positive electrode and negative electrode of the vehicle storage battery.

Exemplarily, the reverse connection protection module 200 generates signals according to detected reverse connection and/or loads, so as to make the switch module 100 connect the emergency start power supply 800 to an auto or auto battery.

Exemplarily, vehicle storage batteries, also known as accumulator cells, are an essential part of the vehicle, and can be divided into conventional lead-acid storage batteries and maintenance-free storage batteries. As the storage battery uses lead-calcium alloy as the lattice (rack), the amount of water generated by decomposition during charging is small, the amount of water evaporated is low, and since the shell adopts a sealed structure, it releases little sulfuric acid gas; it has therefore advantages such as no need for any liquid addition, less butted line pile heads, long power storage duration, etc. The vehicle storage batteries can be nickel-cadmium batteries, nickel-hydrogen batteries, lithium-ion batteries, lithium polymer batteries, lead-acid batteries, etc., without limitation here.

In some embodiments, the vehicle emergency start device is connected to the vehicle storage battery through the output module 700, and the switch module 100 is then connected to the emergency start power supply 800; when the vehicle storage battery is in normal use, the switch module 100 and the output module 700 clips are in ON state, at which time the vehicle can be started; when the vehicle storage battery cannot be used normally (such as no storage battery, removal of storage battery wires or storage battery being completely broken with a voltage of 0V, reverse connection of positive electrode and negative electrode, etc.), reverse connection protection, over current protection, undervoltage protection, reverse charge protection are achieved through reverse connection protection module 200, the over current protection module 300, the battery voltage monitoring module 400 and the reverse charge protection module 500, and emergency start can be achieved through the emergency start switch 600; the vehicle emergency start device owns a reasonable circuit structure and can achieve fault detection and circuit control of the hardware circuitry without the signal processing in the MCU, so that the technical effects of reducing hardware costs and improving protection performance can be realized.

Exemplarily, as shown in FIG. 2, input+ and input− are connected to an output socket of the emergency start power supply 800; the clip+ and clip− in the output module 700 are respectively connected to the positive electrode and negative electrode of the vehicle storage battery. During operation, the emergency start power supply 800 is firstly connected, and then the circuit modules in the protection circuit begin to be powered up and work; and the switch module 100 is in default normally open state, while the output of the output module 700 is in a disconnected state.

Exemplarily, the switch module 100 includes a relay K1, and the protection circuit also includes further a first transistor Q1 and a current sensing resistor R11.

Exemplarily, the first terminal of the relay K1 is respectively connected to the positive electrode of the emergency start power supply 800 and the positive electrode of the output module 700, the second terminal of the relay K1 is connected to the second terminal of the first transistor Q1, the third terminal of the first transistor Q1 is grounded, the third terminal of the relay K1 is connected to the negative electrode of the emergency start power supply 800 through the current sensing resistor R11, and the fourth terminal of the relay K1 is connected to the negative electrode of the output module 700.

Exemplarily, the normal starting of the vehicle is achieved by using the relay K1 as an electronic switch.

It should be appreciated that the transistor described in embodiments of this application is a general term, the transistor provided by embodiments of this application can be a triode (a bipolar transistor), or a field effect transistor (FET), etc.; when the transistor provided by embodiments of this application is a triode, the first, second, third terminals of the triode refer to the base, collector and emitter of the triode; when the transistor provided by embodiments of this application is a field effect transistor, the first, second, third terminals of the transistor refer to the gate, source and drain of the field effect transistor, wherein the field effect transistor can be a Junction gate FET (JFET), a metal oxide semiconductor field effect transistor (MOSFET) or a vertical metal oxide semiconductor (VMOS), etc., without limitation here.

Exemplarily, the reverse connection protection module 200 includes an photocoupler U3, the first terminal of the photocoupler U3 is respectively connected to the positive electrode of the emergency start power supply 800 and the positive electrode of the output module 700, the second terminal of the photocoupler U3 is connected to the negative electrode of the output module 700, the third terminal of the photocoupler U3 is connected to the first terminal of the first transistor Q1, and the fourth terminal of the photocoupler U3 is connected to the reverse charge protection module 500.

Exemplarily, by providing the photocoupler U3, when the positive and negative electrodes of the output module 700 are reversely connected to the electrodes of the vehicle storage battery, the third terminal of the photocoupler U3 is at a low level, the first transistor Q1 cuts off, the relay K1 is in a disconnected state and the clips of the output module 700 cannot output, thus achieving the function of reverse connection protection.

In some implementation scenarios, the vehicle emergency start device provided by embodiments of this application may encounter following situations during normal operation.

In the first case, the vehicle storage battery exists and voltage thereof is not 0V: when the user connects the clip+ and clip− of the output module 700 to the positive and negative electrodes of the vehicle storage battery, the voltage of the vehicle storage battery is supplied to the photocoupler U3 via the diode D1 and resistor R8 for supplying power, the third terminal of the photocoupler U3 outputs a high level to the first transistor Q1, the first transistor Q1 is ON and then the relay K1 is activated, the relay K1 is under attraction and the output module 700 is in the ON state, at which time the vehicle can be started;

In the second case, the voltage is 0V due to that the vehicle storage battery does not exist, the vehicle storage battery wires are removed or the vehicle storage battery is completely broken: when the user connects the clip+ and clip− of the output module 700 to the vehicle storage battery, the relay K1 cannot be automatically switched on because there is no voltage of storage battery supplying power to the photocoupler U3. At this time, the user needs to launch the emergency start switch 600 (i.e. start button K2), the photocoupler U3 forms a loop through the resistor R12, start button K2 and resistor R11, the protection circuit starts to work and the relay K1 is switched on, at which time the vehicle can be started.

Exemplarily, the photocoupler U3 is an electrical-to-optical-to-electrical converting component that uses light as a medium to transmit electrical signals. It consists of two parts: light source and light receiver. The light source and light receiver are assembled in a same closed housing and isolated from each other by a transparent insulator. Pins of the light source are used as the input terminals and pins of the light receiver are the output terminals, and the light source is typically a LED whilst the light receiver a photosensitive diode or a photosensitive triode etc.

Exemplarily, the over current protection module 300 includes a first stage over current protection module 310; and the first stage over current protection module 310 includes a first operational amplifier U1-A, wherein the non-inverting input terminal of the first operational amplifier U1-A is connected to a reference voltage VREF and the inverting input terminal of the first operational amplifier U1-A is connected to the current sensing resistor R11, the output of the first operational amplifier U1-A is connected to the first terminal of the first transistor Q1, the power supply terminal of the first operational amplifier U1-A is respectively connected to the positive electrode of the emergency start power supply 800 and the positive electrode of the output module 700.

Exemplarily, the first stage over current protection module 310 sets a first over current protection current value to achieve a first stage over current protection.

Exemplarily, the over current protection module 300 further includes a second stage over current protection module 320; and the second stage over current protection module 320 includes a second operational amplifier U1-B, wherein the non-inverting input terminal of the second operational amplifier U1-B is connected to the reference voltage VREF and the inverting input terminal of the second operational amplifier U1-B is connected to a current sensing resistor R11, the output of the second operational amplifier U1-B is connected to the first terminal of the first transistor Q1.

Exemplarily, the second stage over current protection module 320 sets a second over current protection current value to achieve a second stage over current protection.

In some embodiments, after the relay K1 is switched on, a voltage drop is generated on the current sensing resistor R11 when over current or short circuit appears in the protection circuit during starting the vehicle, at which time the voltage signal of the current sensing resistor R11 is transmitted to the first operational amplifier U1-A and the second operational amplifier U1-B for comparison respectively, and the first operational amplifier U1-A and the second operational amplifier U1-B are two comparators for setting different over current protection current values in 2 stages, such as 400 A/1 s, 800 A/0.3 s, etc., the over current protection current values here are for example only and not limited. The first operational amplifier U1-A and the second operational amplifier U1-B output low levels, causing the first transistor Q1 to cut off and the relay K1 to be disconnected, thus cutting off the output of the clips of the output module 700 and achieving over current protection.

Exemplarily, the reverse charge protection module 500 includes a third operational amplifier U2-A and a fourth operational amplifier U2-B, wherein the non-inverting input terminal of the third operational amplifier U2-A is connected to the reference voltage VREF, the output terminal of the third operational amplifier U2-A is connected to the fourth terminal of the photocoupler U3; and the non-inverting input terminal of the fourth operational amplifier U2-B is grounded, the inverting input terminal of the fourth operational amplifier U2-B is connected to the current sensing resistor and the output terminal of the fourth operational amplifier U2-B is connected to the inverting input terminal of the third operational amplifier U2-A.

Exemplarily, after the vehicle being started, the vehicle generator will reversely charge the emergency start power supply 800 of the vehicle, at which time a negative voltage (negative current) will appear on the current sensing resistor R11, the voltage signal of the current sensing resistor R11 is transmitted to the third operational amplifier U2-A for comparison after being amplified by the fourth operational amplifier U2-B, then the third operational amplifier U2-A outputs a low level and then turns the photocoupler U3 off, the first transistor Q1 cuts off, the relay K1 is disconnected, and the output of the clips of the output module 700 is cut off, thus achieving the function of reverse charge protection.

Exemplarily, the battery voltage monitoring module 400 includes a second transistor Q2 and a third transistor Q3; the second terminal of the second transistor Q2 is connected to the power supply terminal of the third operational amplifier U2-A, the third terminal of the second transistor Q2 is respectively connected to positive electrodes of the emergency start power supply 800 and of the output module 700; the first terminal of the third transistor Q3 is respectively connected to positive electrodes of the emergency start power supply 800 and of the output module 700, the second terminal of the third transistor Q3 is connected to the first terminal of the second transistor Q2 and the third terminal of the third transistor is grounded.

Exemplarily, when the vehicle storage battery voltage is not enough and it appears undervoltage at the input voltage, the third transistor Q3 cuts off, and the second transistor Q2 cuts off and then the power supplying of the third operational amplifier U2-A is stopped, so that the photocoupler U3 is switched off, the first transistor Q1 cuts off, the relay K1 is disconnected and the output module 700 clips have no output, achieving the function of undervoltage protection.

Figure 3:
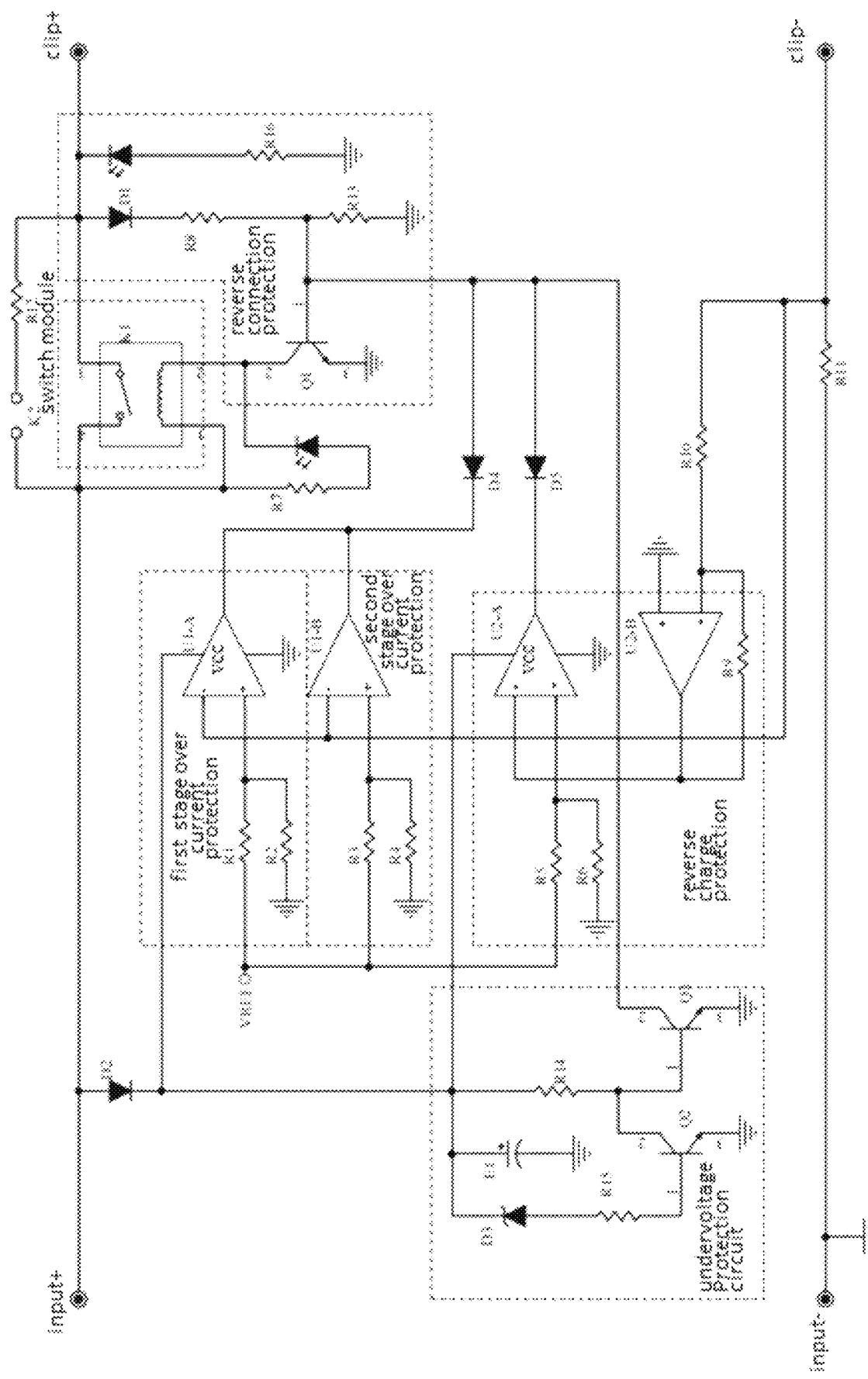
FIG. 3 is a schematic circuit diagram of a second vehicle emergency start device provided according to an embodiment of this application.

Please refer to FIG. 3, which is a schematic circuit diagram of the second vehicle emergency start device provided by embodiments of this application.

Exemplarily, the reverse connection protection module 200 includes a fourth transistor Q4, wherein the first terminal of the fourth transistor Q4 is respectively connected to the third terminal of the relay K1, the emergency start switch 600 (i.e. start button K2) and the positive electrode of the output module 700, the second terminal of the fourth transistor Q4 is connected to the second terminal of the relay K2, and the third terminal of the fourth transistor Q4 is grounded.

Exemplarily, when the user reversely connects the clip+ and clip− in the output module 700 to positive and negative electrodes of the vehicle storage battery, the fourth transistor Q4 cuts off and the reverse connection protection module 200 is in a cut-off state, the relay K1 is in a disconnected state and the output module 700 clips cannot output, thus achieving the function of reverse connection protection.

It should be appreciated that the difference between the protection circuit shown in FIG. 3 and that shown in FIG. 2 lies in the specific composition of the reverse connection protection module 200, wherein the reverse connection protection module 200 in the protection circuit shown in FIG. 2 achieves the function of reverse connection protection through a photocoupler U3 and the reverse connection protection module 200 in the protection circuit shown in FIG. 3 achieves the function of reverse connection protection through the fourth transistor Q4, and the circuit structure and functions in rest parts are similar and will not be repeated here.

Exemplarily, the protection circuit includes further a first LED DH and a second LED DL; the positive electrode of the first LED DH is grounded and the negative electrode of the first LED DH is connected to the positive electrode of the output module 700; the positive electrode of the second LED DL is respectively connected to the positive electrode of the emergency start power supply 800 and the first terminal of the relay K1, and the negative electrode of the second LED DL is connected to the second terminal of the fourth transistor Q4.

Exemplarily, when the user reversely connects the clip+ and clip− in the output module 700 to positive and negative electrodes of the vehicle storage battery, the first LED DH emits light, thus reminding the user of reverse connection of the output module 700 to the positive and negative electrodes of the storage battery and achieving the function of reverse connection protection; and when the user connects the clip+ and clip− in the output module 700 to positive and negative electrodes of the vehicle storage battery correctly, the second LED DL emits light for indication.

In some embodiments, the first LED DH may be a red-light light emitting diode and the second LED DL may be a green-light light emitting diode.

Figure 4:
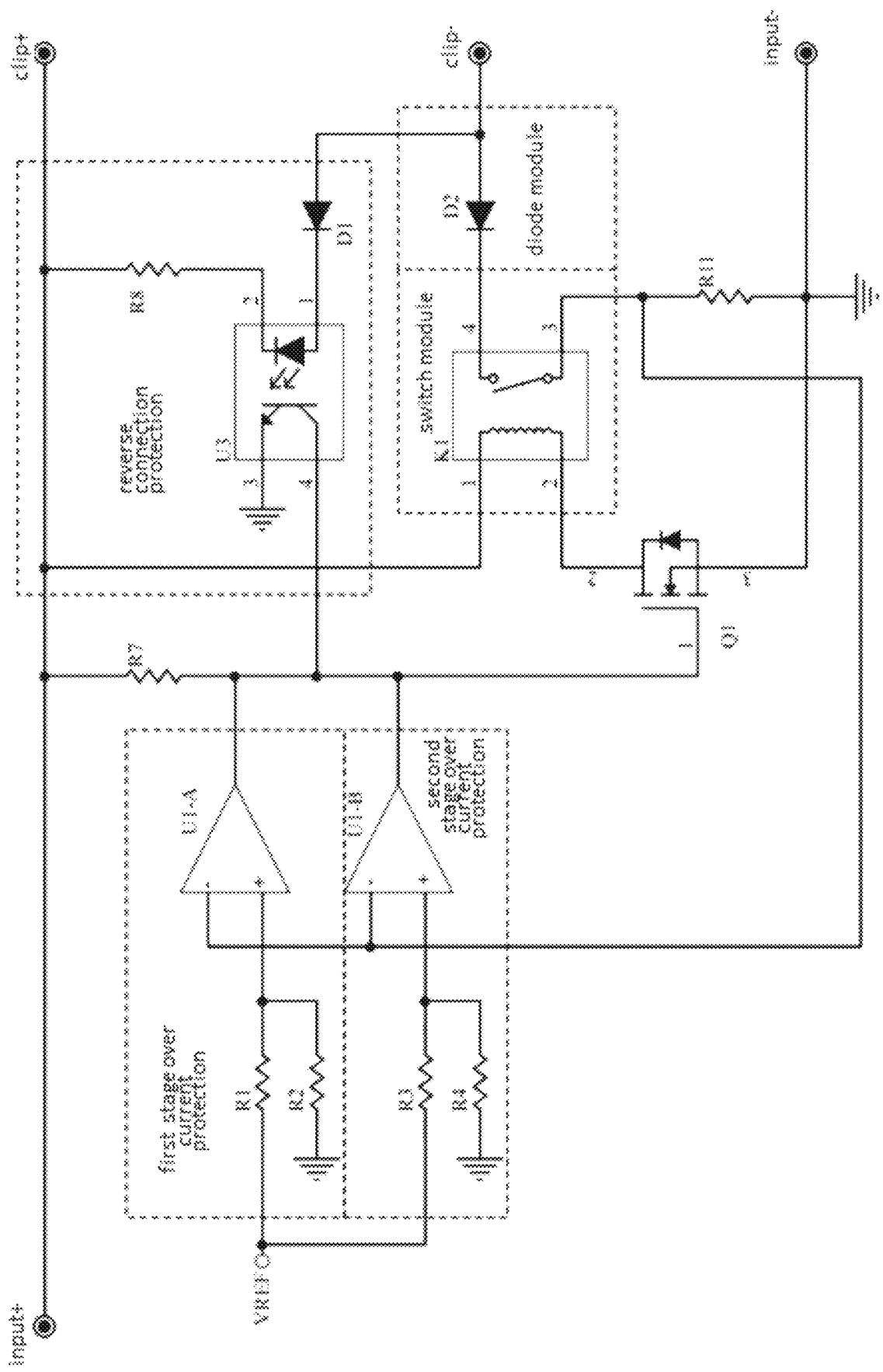
FIG. 4 is a schematic circuit diagram of a third vehicle emergency start device provided according to an embodiment of this application.

Please refer to FIG. 4, which is a schematic circuit diagram of the third vehicle emergency start device provided by embodiments of this application.

Exemplarily, the reverse charge protection module 500 shown in FIG. 4 achieves the function of reverse charge protection through a diode module, and rest of the circuit has been introduced in the embodiment in FIG. 2, so here it will not be repeated to avoid repetition.

Figure 5:
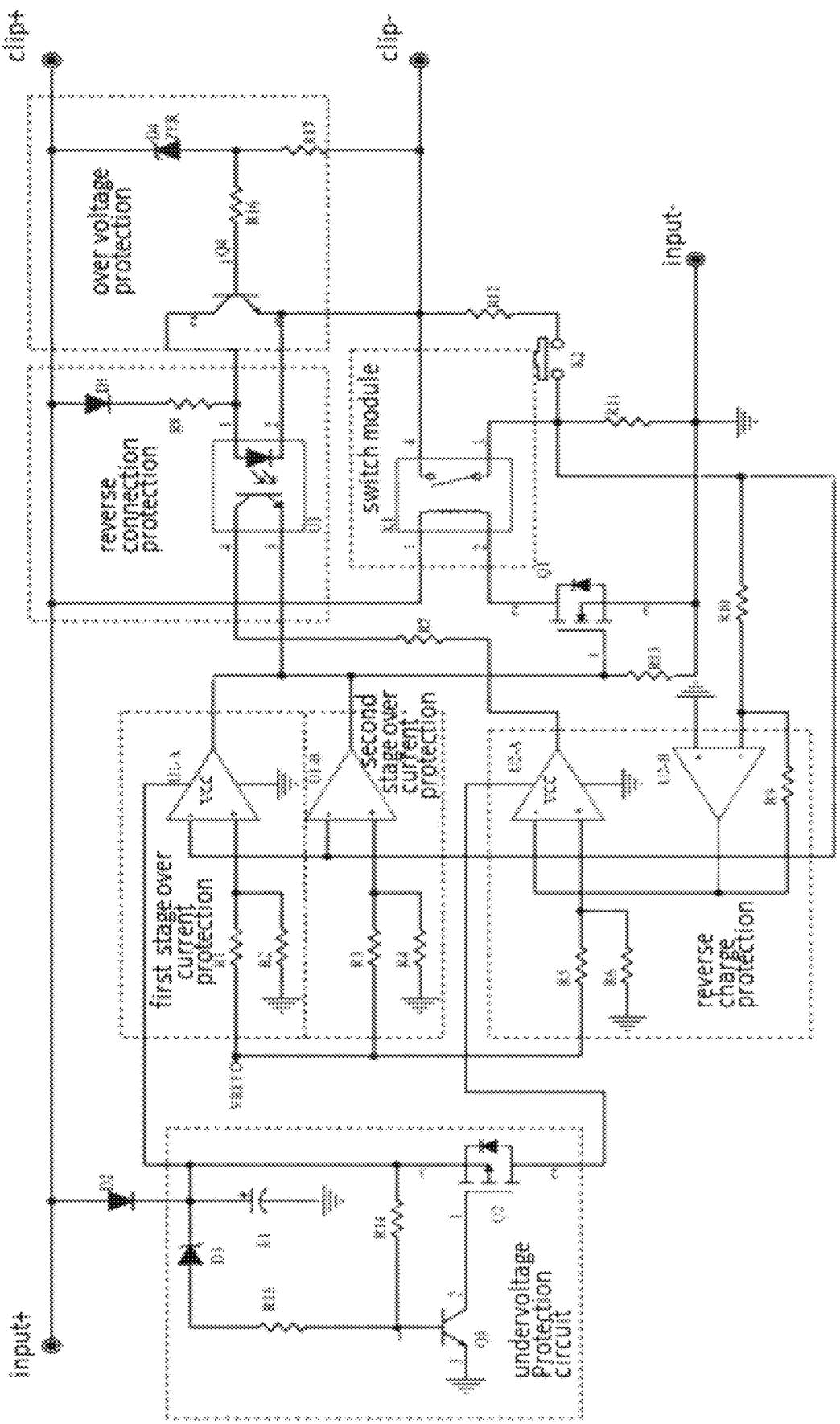
FIG. 5 is a schematic circuit diagram of a fourth vehicle emergency start device provided according to an embodiment of this application.

Please refer to FIG. 5, which is a schematic circuit diagram of the fourth vehicle emergency start device provided by embodiments of this application.

Exemplarily, the over voltage protection module 900 shown in FIG. 5 includes a fourth transistor Q4 and a diode D4; the first terminal of the fourth transistor Q4 is connected to the positive electrode of the output module 700 through the diode D4, the second terminal of the fourth transistor Q4 is connected to the reverse connection protection module 200, and the third terminal of the fourth transistor Q4 is connected to the positive electrode of the output module 700; the over voltage protection module 900 achieves the function of over voltage protection through the fourth transistor Q4 and the diode D4, and rest of the circuit has been introduced in the embodiment in FIG. 2, so here it will not be repeated to avoid repetition.

In some implementation scenarios, embodiments of this application further provide a jump control system for vehicle emergency start, including any one of the vehicle emergency start devices shown in FIG. 1 to FIG. 3.

It should be appreciated that in the circuit diagrams provided by embodiments of this application, Q refers to a transistor, D refers to a diode, R refers to a resistor, E refers to a polarized capacitor and K refers to an electronic switch; circuit components, such as diodes, resistors, not described in embodiments of this application, are added to ensure that the circuit can work normally, and it will not be repeated here.

Figure 6:
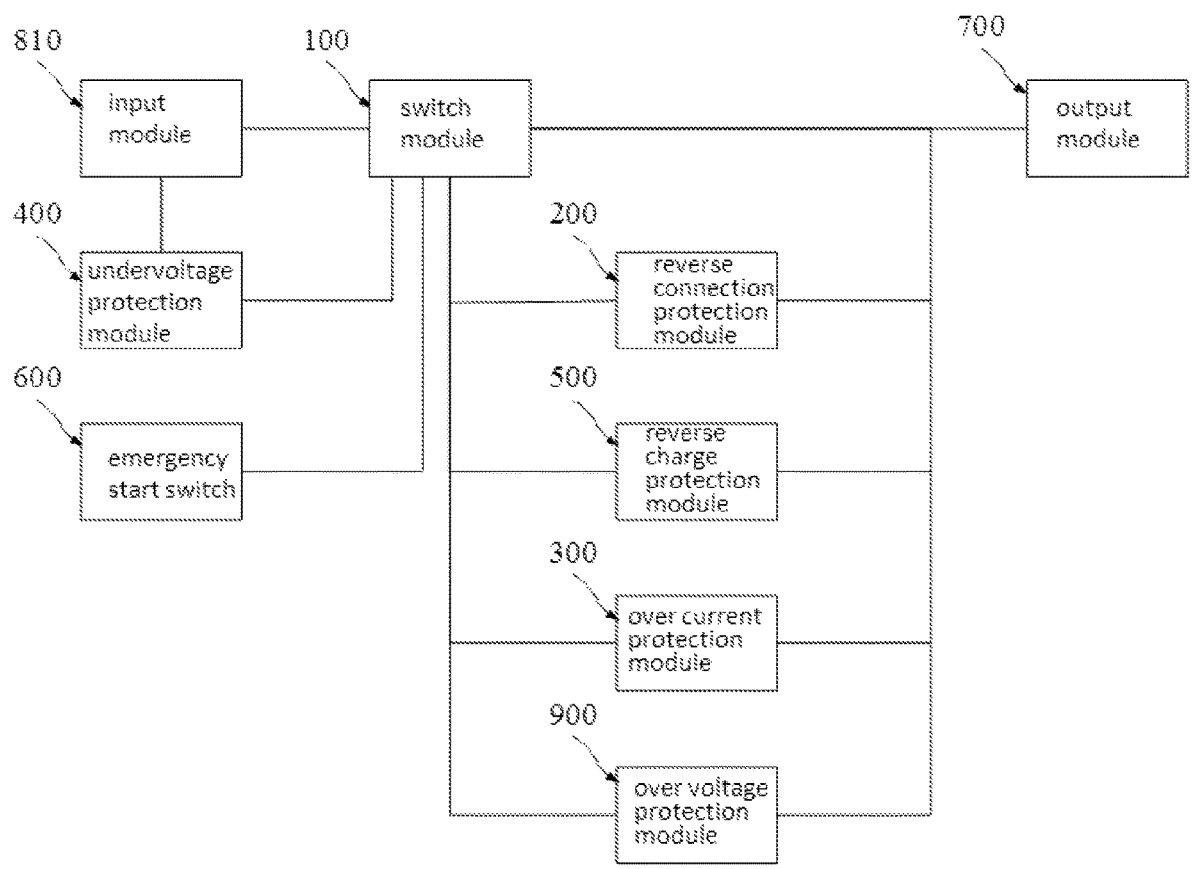
FIG. 6 is a structure block diagram of a wire clip device for vehicle emergency start provided according to an embodiment of this application.

Please refer to FIG. 6, which is a structure block diagram of the vehicle emergency wire clip device provided by embodiments of this application.

Embodiments of this application provide further a wire clip device for vehicle emergency start, including a switch module 100, a reverse connection protection module 200, an emergency start switch 600, an input module 810 and an output module 700; the switch module 100 is respectively connected to the input module 810 and the output module 700; the reverse connection protection module 200 is respectively connected to the switch module 100 and the output module 700, and the reverse connection protection module 200 is used for reverse connection detection and/or load detection; and the emergency start switch 600 is connected to the switch module 100.

Exemplarily, the difference between the wire clip device for vehicle emergency start and the vehicle emergency start device shown in FIG. 1 to FIG. 5 lies in the emergency start power supply and input module of the vehicle, the rest parts correspond one by one; it will not be repeated here to avoid repetition.

Further, the reverse connection protection module 200 generates signals according to detected reverse connection and/or loads, so that the switch module connects the input module to an auto or auto battery.

In the several embodiments provided in this application, it should be appreciated that it is possible that the various functional modules in embodiments are integrated together to form a separate part, or that the individual modules exist separately, or that two or more modules are integrated to form a separate part.

The above are only examples of this application, and is not intended to limit the protection scope of this application. The present application can have various changes and variations for those skilled in the art. Any modification, equivalent substitution, improvement, etc. made within the spirit and principles of this application shall be included in the protection scope of this application. It should be noted that similar signs and letters indicate similar items in the drawings below, so that once an item is defined in a drawing, it does not need to be further defined or explained in the subsequent drawings.

What has been described above are only embodiments of this application, but the protection scope of this application is not limited to this, and any variation or substitution, that a person skilled in the art can easily conceive within the technical scope disclosed in this application, shall be included in the protection scope of this application. Therefore, the protection scope of this application shall be subject to the protection scope of the claims.

It should be noted that relationship terms such as first and second are used in this document only to distinguish one entity or operation from another and do not necessarily require or imply any such actual relationship or order between these entities or operations. Moreover, the terms "include", "comprise" or any other variation thereof are intended to cover non-exclusive inclusion, such that a process, method, article, or apparatus comprising a set of elements includes not only those elements, but also other elements not expressly listed, or elements inherent to such process, method, article, or apparatus. Without further limitation, the elements defined by the statement "including a . . . " do not preclude the existence of additional identical elements in the process, method, article, or apparatus including said elements.

What is claimed is:

1. A vehicle emergency start device, comprising: a switch module, a reverse connection protection module, an emergency start switch and an output module,
    wherein the switch module is respectively connected to an emergency start power supply of a vehicle and to the output module;
    the reverse connection protection module is respectively connected to the switch module and the output module, and the reverse connection protection module is configured for performing reverse connection detection and/or load detection; and
    the emergency start switch is connected to the switch module.

2. The vehicle emergency start device according to claim 1, wherein the reverse connection protection module comprises a photocoupler, wherein a first terminal of the photocoupler is respectively connected to a positive electrode of the emergency start power supply and a positive electrode of the output module, a second terminal of the photocoupler is connected to a negative electrode of the output module, a third terminal of the photocoupler is connected to the switch module, and a fourth terminal of the photocoupler is grounded.

3. The vehicle emergency start device according to claim 1, further comprising an over current protection module, which is respectively connected to the switch module and to the output module.

4. The vehicle emergency start device according to claim 3, wherein the over current protection module comprises a first stage over current protection module and a second stage over current protection module; and the first stage over current protection module comprises a first operational amplifier, wherein a non-inverting input terminal of the first operational amplifier is connected to a reference voltage, and an inverting input terminal of the first operational amplifier is connected to a current sensing resistor, an output terminal of the first operational amplifier is connected to a first terminal of a first transistor, and a power supply terminal of the first operational amplifier is respectively connected to a positive electrode of the emergency start power supply and a positive electrode of the output module; and the second stage over current protection module comprises a second operational amplifier, a non-inverting input terminal of the second operational amplifier is connected to the reference voltage and an inverting input terminal of the second operational amplifier is connected to the current sensing resistor, and an output terminal of the second operational amplifier is connected to the first terminal of the first transistor.

5. The vehicle emergency start device according to claim 1, further comprising a reverse charge protection module, which is respectively connected to the switch module and to the output module.

6. The vehicle emergency start device according to claim 5, wherein the reverse charge protection module comprises a third operational amplifier and a fourth operational amplifier;

a non-inverting input terminal of the third operational amplifier is connected to a reference voltage and an output terminal of the third operational amplifier is connected to the reverse connection protection module; and a non-inverting input terminal of the fourth operational amplifier is grounded, an inverting input terminal of the fourth operational amplifier is connected to a current sensing resistor, and an output terminal of the fourth operational amplifier is connected to an inverting input terminal of the third operational amplifier.

7. The vehicle emergency start device according to claim 1, wherein the output module is connected to a battery of the vehicle, the battery is respectively connected to the switch module and to a battery voltage monitoring module.

8. The vehicle emergency start device according to claim 7, wherein the battery voltage monitoring module comprises a second transistor and a third transistor;

a second terminal of the second transistor is connected to a power supply terminal of the third operational amplifier, and a third terminal of the second transistor is respectively connected to a positive electrode of the emergency start power supply and a positive electrode of the output module; and a first terminal of the third transistor is respectively connected to the positive electrode of the emergency start power supply and the positive electrode of the output module, a second terminal of the third transistor is connected to a first terminal of the second transistor, and a third terminal of the third transistor is grounded.

9. The vehicle emergency start device according to claim 1, further comprising an over voltage protection module, which is respectively connected to the switch module and to the output module.

10. The vehicle emergency start device according to claim 9, wherein the over voltage protection module comprises a fourth transistor and a diode; and a first terminal of the fourth transistor is connected to the positive electrode of the output module through the diode, a second terminal of the fourth transistor is connected to the reverse connection protection module, and a third terminal of the fourth transistor is grounded.

11. The vehicle emergency start device according to claim 1, wherein the reverse connection protection module is configured to generate signals according to detected reverse connection and/or loads, so as to make the switch module connect the emergency start power supply to an auto or an auto battery.

12. A wire clip device for vehicle emergency start, comprising a switch module, a reverse connection protection module, an emergency start switch, an input module and an output module, wherein the switch module is respectively connected to the input module and to the output module;

the reverse connection protection module is respectively connected to the switch module and to the output module, and the reverse connection protection module is configured for performing reverse connection detection and/or load detection; and the emergency start switch is connected to the switch module.

13. The wire clip device for vehicle emergency start according to claim 12, wherein the reverse connection protection module is configured to generates signal according to detected reverse connection and/or loads, so as to make the switch module connect the input module to an auto or an auto battery.

* * * * *